(12) United States Patent
Hayashi

(10) Patent No.: US 6,272,105 B1
(45) Date of Patent: Aug. 7, 2001

(54) OPTICAL DISC AND OPTICAL DISC REPRODUCING APPARATUS

(75) Inventor: Hideki Hayashi, Tsurugashima (JP)

(73) Assignee: Pioneer Corporation, Tokyo-to (JP)

(*) Notice: Subject to any disclaimer, the term of this patent is extended or adjusted under 35 U.S.C. 154(b) by 0 days.

(21) Appl. No.: 09/490,870

(22) Filed: Jan. 24, 2000

(30) Foreign Application Priority Data

Jan. 25, 1999 (JP) ................................ 11-016189

(51) Int. Cl.$^7$ ........................................ G11B 7/24
(52) U.S. Cl. ............................ 369/275.3; 369/275.4
(58) Field of Search .................. 369/275.3, 275.4, 369/275.2, 13, 32, 47.14, 53.1, 53.2, 53.41, 44.26

(56) References Cited

U.S. PATENT DOCUMENTS

| | | | | |
|---|---|---|---|---|
| 5,533,003 | * | 7/1996 | Kobayashi | 369/275.4 |
| 5,566,158 | * | 10/1996 | Kobayashi et al. | 369/48 |
| 5,577,012 | * | 11/1996 | Kobayashi et al. | 369/48 |
| 5,615,193 | * | 3/1997 | Kobayashi et al. | 369/275.3 |
| 5,729,518 | * | 3/1998 | Kobayashi | 369/59 |
| 5,798,996 | * | 8/1998 | Arai | 369/59 |
| 5,809,004 | * | 9/1998 | Kobayashi et al. | 369/275.3 |
| 5,818,805 | * | 10/1998 | Kobayashi et al. | 369/59 |
| 6,091,701 | * | 7/2000 | Koboyashi | 369/275.4 |

FOREIGN PATENT DOCUMENTS 12-215458 * 8/2000 (JP) ................................ 369/275.3

OTHER PUBLICATIONS

"Application of Liquid Crystal to an Optical Head for Optical Discs," Sakashi Ohtaki et al., ITE Technical Report, vol. 21, No. 50, Sep. 1997, pp. 1–6.

"Simulation of a High Density Optical Disc System Employing Multi–Level Pit Edge Recording and 2 Dimensional PRML Reproduction" vol. 98, No. 333, pp. 7–13, MR98–30, Technical Report of the Institute of Electronics, Information and Communication Engineers (Oct. 1998).

* cited by examiner

*Primary Examiner*—Tan Dinh
(74) *Attorney, Agent, or Firm*—Morgan, Lewis & Bockius LLP

(57) ABSTRACT

An optical disc on which a plurality of data pits whose edge positions are shifted according to a multi-level pit edge recording method are recorded includes a substrate member and a plurality of tracks formed on the substrate member. A plurality of data areas and a plurality of reference areas are formed on the substrate member such that each of the data areas and the reference areas is formed continuously over the plurality of tracks. The data pits corresponding to digital data are recorded on the tracks in each of the data areas according to the multi-level pit edge recording method. Tilt reference pits which are used as a reference for detecting a tilt of the optical disc relative to a direction of a light beam which is emitted to the optical disc to record or reproduce the digital data are recorded on the tracks in each of the reference areas.

10 Claims, 17 Drawing Sheets

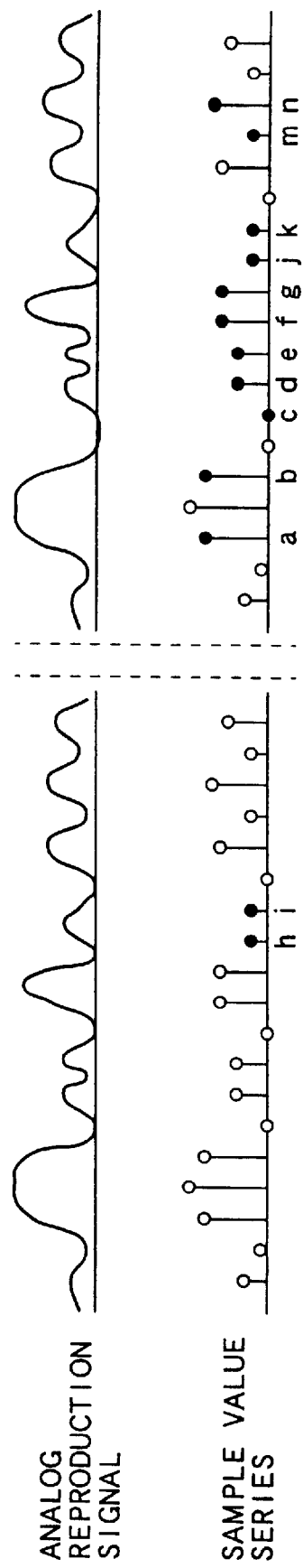

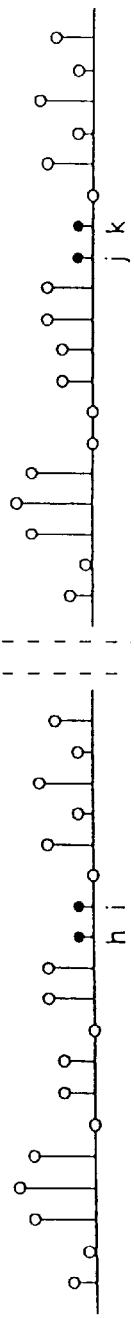
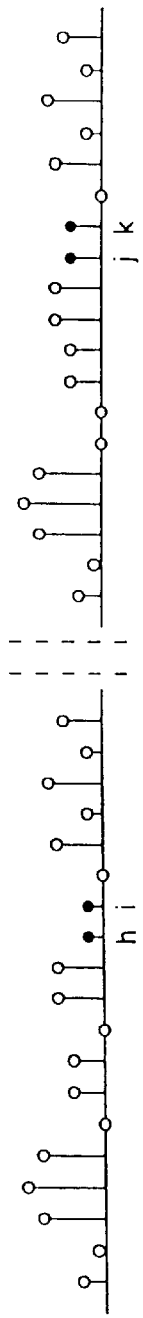
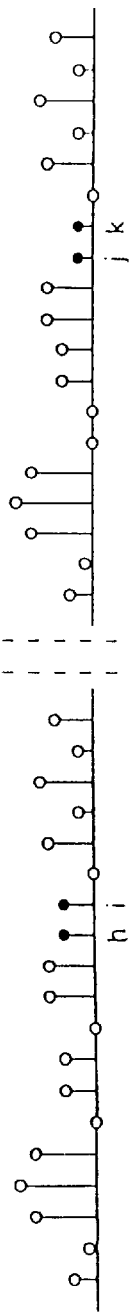
FIG. 9(a)
FIG. 9(b)
FIG. 9(c)

PRIOR ART
FIG. 16
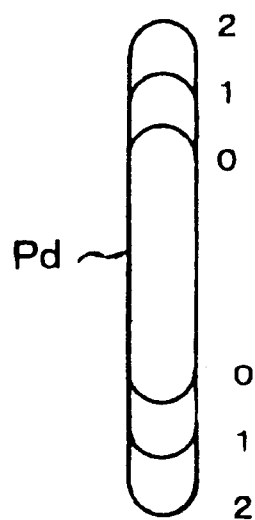
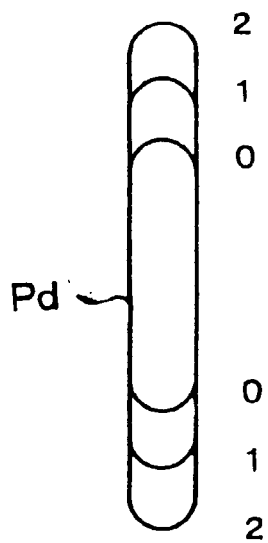

OPTICAL DISC AND OPTICAL DISC REPRODUCING APPARATUS

BACKGROUND OF THE INVENTION

1. Field of the Invention

The present invention relates to an optical disc on which digital data is recorded at a high density by using a multi-level pit edge recording method, and an optical disc reproducing apparatus which decodes and reproduces the digital data from the optical disc.

2. Description of the Related Art

In recent years, as a method of recording and reproducing digital data on an optical disc at a high density, an attention is paid to a multi-level pit edge recording method which modulates positions of edges of each pit on the optical disc in multiple levels so as to record the digital data by multiple levels. An attention is also paid to Partial Response Maximum Likelihood (PRML) reproduction which is a combination of a partial response technique and a Viterbi decoding technique. Further, there is proposed a method combining the multi-level pit edge recording and the PRML reproduction. For example, this method is disclosed in "Simulation of a High Density Optical Disc System Employing Multi-level Pit Edge Recording and 2 Dimensional PRML Reproduction" Vol. 98, No. 333, pp. 7–13, MR98-30, Technical Report of the Institute of Electronics, Information and Communication Engineers (October. 1998).

FIG. 15 shows a pit arrangement of the optical disc employing the method mentioned above. In FIG. 15, on an optical disc 101, there are data areas 101a on which pits carrying the digital data thereon are formed, and reference areas 101b on which reference pit patterns for carrying various kinds of information necessary for controlling a reproduction are formed.

In each of the data areas 101a, data pits Pd are arranged on tracks of the optical disc 101 at a constant interval. In each of the data pits Pd, three-level digital data is recorded by shifting the position of the pit edge in multiple levels. Particularly, as shown in FIG. 16, in the case of recording the three-level digital data comprising (0, 1, 2), at "0", the position of the pit edge is shifted by a constant distance in a direction that a pit length is shortened, at "1", the position of the pit edge is maintained, and at "2", the position of the pit edge is shifted by a constant distance in a direction that the pit length is lengthened. In addition, in FIGS. 15 and 16, all the positions of the pit edge corresponding to three levels of the three-level digital data are illustrated in an overlapping manner for ease of understanding. Actually, one position among the illustrated positions is determined depending on the level of the three-level digital data.

In each of the reference areas 101b, there are formed synchronous pits Ps, tracking pits Pt and clock pits Pc, as shown in FIG. 15. These pits form reference pit patterns as a whole. The synchronous pits Ps are used as a reference for a synchronous control at a time of reproducing, and each has a pit length longer than the other pits. The tracking pits Pt are used as a reference for a tracking control with respect to the optical disc 101, and are arranged so that the position of each pit is shifted at a predetermined distance at a three-track period. The clock pits Pc are used as a reference for reproducing a clock signal at a time of reproducing, and each clock pit PC is arranged at the same position of each of the tracks in parallel.

When reproducing the optical disc 101a beam spot SP of a reproducing laser beam traces on a center line of two tracks shown by a broken line in FIG. 15. When the beam spot SP reaches, for example, point z in FIG. 15, four pit edges corresponding to front and rear pit edges on both adjacent tracks are read at the same time.

FIG. 17 shows a schematic structure of an optical disc reproducing apparatus to which the aforementioned multi-level pit edge recording method is applied. In FIG. 17, the optical pickup 102 irradiates the optical disc 101 with a reproducing laser beam, thereby forming the beam spot SP on the optical disc 101. The optical pickup 102 then receives the light beam reflected by the optical disc 101 and generates an analog reproduction signal. An amplifier 103 amplifies the analog reproduction signal, and an N/D converter 104 converts the analog reproduction signal into a digital signal. This digital signal is output from the A/D converter 104 as sample value series. A digital filter 105 then rectifies the waveform of the sample value series to obtain a desired frequency characteristics. A Viterbi decoding circuit 106 compares the sample value series with a reference level, thereby generating reproduction data series in which a square difference is minimized. The reproduction data series is output to a circuit in the later stage from the Viterbi decoding circuit 106.

A clock phase detecting circuit 109 extracts sample values corresponding to the clock pits Pc from the sample value series output from the digital filter 105, and calculates a phase error between the reproduction signal and a reproduction clock, thereby generating phase error signal. A clock generating circuit 108 changes the frequency of the reproduction clock in accordance with the phase error signal and outputs the reproduction clock to the A/D converter 104. Thus, the phase-synchronization between the reproduction clock and the reproduction signal can be established.

A tracking error detecting circuit 110 extracts sample values corresponding to the tracking pits Pt from the sample value series output from the digital filter 105, and calculates a tracking error in the reproduction of the optical disc 101, thereby generating a tracking error signal. A tracking servo circuit 107 controls the position of the optical pickup 102 in a radial direction of the disc in accordance with the tracking error signal.

A synchronization detecting circuit 111 extracts sample values based on the synchronous pits Ps from the sample value series output from the digital filter 105, and generates a synchronization detecting signal for synchronizing the reproducing system. A timing generating circuit 112 supplies various kinds of timing signals generated on the basis of the synchronization detecting signal to each of components of the optical disc reproducing apparatus.

In the optical disc reproducing apparatus mentioned above, since four pit edges each of which carries three digital data comprising (0, 1, 2) are simultaneously read, in the reproduction signal, nine value levels (0 to 8) can be obtained by respectively adding three values at each of four pit edges. The digital data recorded on the optical disc 101 can be reproduced from the nine value level in the reproduction signal by using the PRML method. Accordingly, in comparison with the case of recording and reproducing the digital data of two value level, it is advantageous in view of increasing a recording density of the optical disc 101.

However, in the conventional method mentioned above, since the reproduction signal is finely classified into nine value level, a difference in each of the levels is small, so that it is hard to accurately determine the level and the data error tends to be increased. In particular, when the waveform of the reproduction signal is distorted due to various kinds of reasons, the data error is significantly increased.

A tilt of an optical disc caused by a warp of the optical disc is one of the causes that the waveform of the reproduction signal is distorted. In reproducing digital data from the optical disc, keeping the relationship in position between the reproduction laser beam and the optical disc perpendicular is ideal. However, if the tilt of the optical disc is generated due to a warp of the optical disc, the relationship in position between the reproduction laser beam and the optical disc cannot be kept perpendicular. As a result, the reproduction signal is distorted due to the influence of wavefront aberration of the reproduction laser beam.

Thus, in the conventional method mentioned above, as a result that the level of the reproduction signal is finely classified, the data error is easily increased due to the influence of the tilt of the optical disc, so that there is a problem that reproduction performance of the optical disc is deteriorated.

SUMMARY OF THE INVENTION

An object of the present invention is to provide an optical disc and an optical disc reproducing apparatus which can restrict the influence of a tilt of the optical disc and which can improve the accuracy of reproduction of digital data recorded on the optical disc in accordance with a multi-level pit edge recording method.

An optical disc in accordance with the present invention includes a substrate member and a plurality of tracks formed on the substrate member. On the tracks, a plurality of data pits whose edge positions are shifted according to a multi-level pit edge recording method are recorded. A plurality of data areas and a plurality of reference areas are formed on the substrate member such that each of the data areas and the reference areas is formed continuously over the plurality of tracks. The data pits corresponding to digital data are recorded on the tracks in each of the data areas according to the multi-level pit edge recording method. Tilt reference pits are recorded on the tracks in each of the reference areas.

By using the tilt reference pit, a tilt of the optical disc relative to the direction of the light beam for the recording or reproduction of the digital data can be detected. On the basis of the tilt detection, the influence of a tilt of the optical disc can be reduced, and the accuracy of the recording or reproduction of the digital data recorded on the optical disc in accordance with the multi-level pit edge recording method can be improved.

In the optical disc in accordance with the present invention, the data areas and the reference areas may be alternately arranged in the circumferential direction of the optical disc. In this case, when reading pits from the optical disc, the data pits and the tilt reference pits are alternately read. Therefore, the tilt can be detected many times at various areas of the optical disc. Accordingly, if a tilt of the optical disc varies with areas of the optical disc, the tilt can be accurately detected.

In the optical disc in accordance with the present invention, the tilt reference pit may be used as a reference for detecting a tilt in the radial direction of the optical disc. In this case, a tilt in the radial direction of the optical disc can be accurately detected.

In the optical disc in accordance with the present invention, the tilt reference pit may be used as a reference for detecting a tilt in the tangential direction of the optical disc. In this case, a tilt in the tangential direction of the optical disc can be accurately detected.

In the optical disc in accordance with the present invention, a first space which has no pit may be formed on one of the tracks located on the left side of the track on which the tilt reference pit is formed, a second space which has no pit may be formed on one of the tracks located on the right side of the track on which the tilt reference pit is formed, a third space which has no pit may be formed on an upper side of the tilt reference pit, and a fourth space which has no pit may be formed on a lower side of the tilt reference pit. By forming the spaces in the vicinity of the tilt reference pit, the tilt reference pit is independent from other pits. Therefore, the tilt can be accurately and easily detected.

In the optical disc in accordance with the present invention, the tilt reference pit may be used as both the reference for detecting the tilt of the optical disc and a reference for a tracking servo control in reproducing or recording the digital data. Since such two functions are given to the tilt reference pit, the reference area can be made smaller. Therefore, the recording density of the optical disc can be increased.

An optical disc reproducing apparatus in accordance with the present invention is an apparatus for reproducing digital data recorded on the optical disc on which the tilt reference pit mentioned above is formed. The apparatus includes: a reading device that reads the data pits from the optical disc by emitting the light beam to the optical disc and generates a reproduction signal indicating the edge positions of the data pits; a tilt detecting device that detects the tilt of the optical disc on the basis of the tilt reference pit, and generates tilt error signal indicating the tilt; and a tilt compensating device that reduces an influence of the tilt of the optical disc on the basis of the tilt error signal.

According to this optical disc reproducing apparatus, if a tilt of the optical disc occurs, the influence of the tilt can be reduced by detecting the tilt reference pit.

In the optical disc reproducing apparatus in accordance with the present invention, the tilt compensating device may reduce an influence of the tilt of the optical disc by reducing wavefront aberration in the light beam.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 3 is a diagram showing a waveform pattern of an analog reproduction signal and a pattern of a sample value series in the optical disc reproducing apparatus in accordance with the embodiment of the present invention;

FIG. 9 is a diagram showing patterns of sample value series in the case of generating a radial tilt of the optical disc;

FIG. 16 is a diagram showing pit edge positions in the multi-level pit edge recording method.

DETAILED DESCRIPTION OF THE PREFERRED EMBODIMENTS

A description will be given below of a preferred embodiment in accordance with the present invention with reference to the accompanying drawings.

Figure 1:
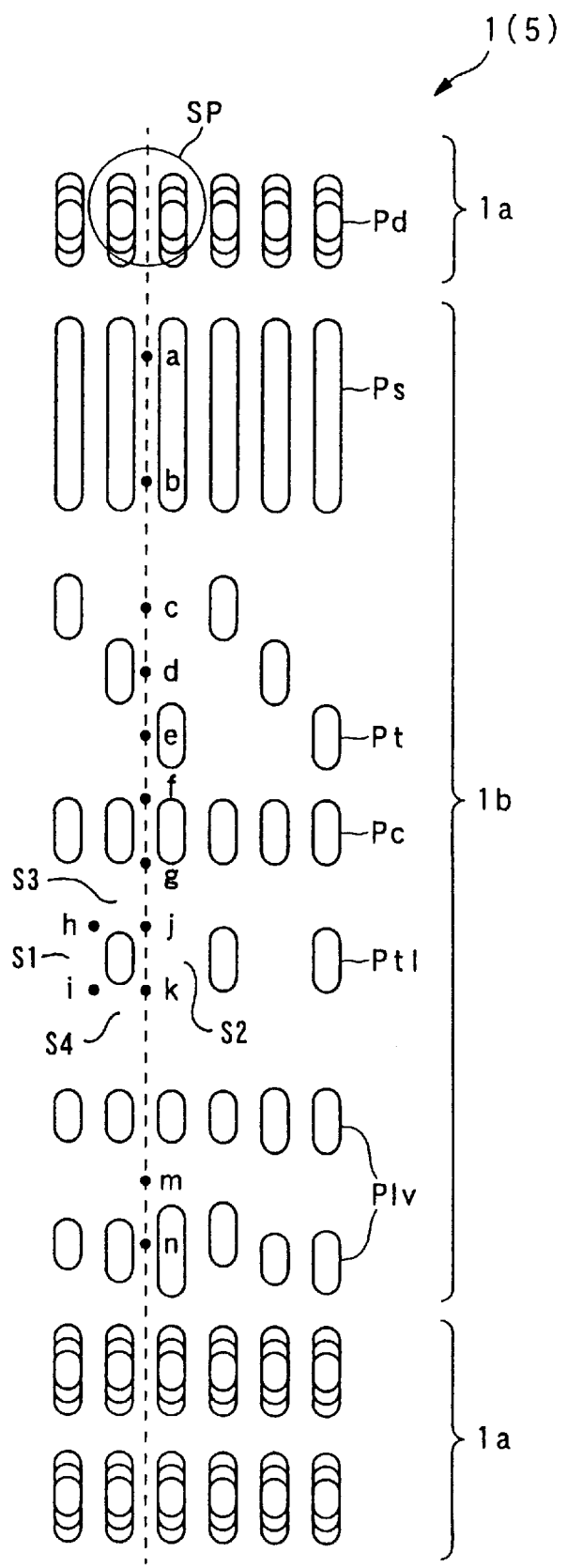
FIG. 1 is a diagram showing an arrangement of pits of an optical disc in accordance with an embodiment of the present invention.

FIG. 1 shows an arrangement of pits of an optical disc in accordance with the embodiment of the present invention. The optical disc shown in FIG. 1 has a substrate member 5. On the substrate member 5 of an optical disc 1 shown in FIG. 1, there are data areas 1a on which pits carrying digital data thereon are formed, and reference areas 1b on which reference pit patterns for carrying various kinds of information necessary for controlling a reproduction are formed. Each of the data areas 1a is formed continuously over the plurality of tracks, as shown in FIG. 1. Also, each of the reference areas 1b is formed continuously over the plurality of tracks. The data areas 1a and the reference areas 1b are arranged alternately in the circumferential direction of the optical disc 1.

In each of the data area 1a, data pits Pd are arranged on tracks of the optical disc 1 at a constant interval. In each of the data pits Pd, three-level digital data comprising (0, 1, 2) is recorded by shifting the position of the pit edge in multiple levels on the basis of a multi-level pit edge recording method in the same manner as that of the conventional method, as shown in FIG. 16. In such a manner, the three-level digital data is recorded in the data area of the optical disc 1 as the position of pit edge.

In each of the reference areas 1b, there are formed synchronous pits Ps, tracking pits Pt, clock pits Pc, level reference pits Plv and tilt reference pits Ptl shown in FIG. 1.

The level reference pits Plv are formed in accordance with a predetermined pattern to determine reference values for a Viterbi decoding process. The level reference pits Plv are utilized for ensuring the accuracy of the Viterbi decoding process. By using the level reference pits Plv, it is possible to reduce the influence of level variation or signal waveform distortion, thereby correcting the Viterbi decoding process and thus preventing the deterioration of the reproduction performance. Although the data pits Pd are irregularly changed in length depending on the digital data which are irregularly changed, the length of each of the level reference pits Plv may be regularly changed in a periodic manner.

The tilt reference pits Ptl correspond to the reference value for controlling a tilt of the optical disc 1, and one tilt reference pit Ptl is provided for each two tracks. Namely, as shown in FIG. 1, a space S1 which has no pit is formed on the track located on the left side of the track on which the tilt reference pit Ptl is formed. A second space S2 which has no pit is formed on the track located on the right side of the track on which the tilt reference pit Ptl is formed. Furthermore, a third space S3 which has no pit is formed on the upper side of the tilt reference pit Ptl, and a fourth space S4 which has no pit is formed on the lower side of the tilt reference pit. Since the tilt reference pit Ptl is surrounded by the spaces S1 to S4, the tilt reference pit Ptl is independent from other pits. The tilt reference pits Ptl are utilized for detecting a tilt error which shows a tilt between disc surface and a reproduction laser beam. By using this tilt error, the distortion of a reproduction signal can be reduced.

In addition, a repeating number of the data area 1a and the reference area 1b can be suitably set within one track. For example, it may be set in the range of about 100 to 10000 times within one track.

Figure 15:
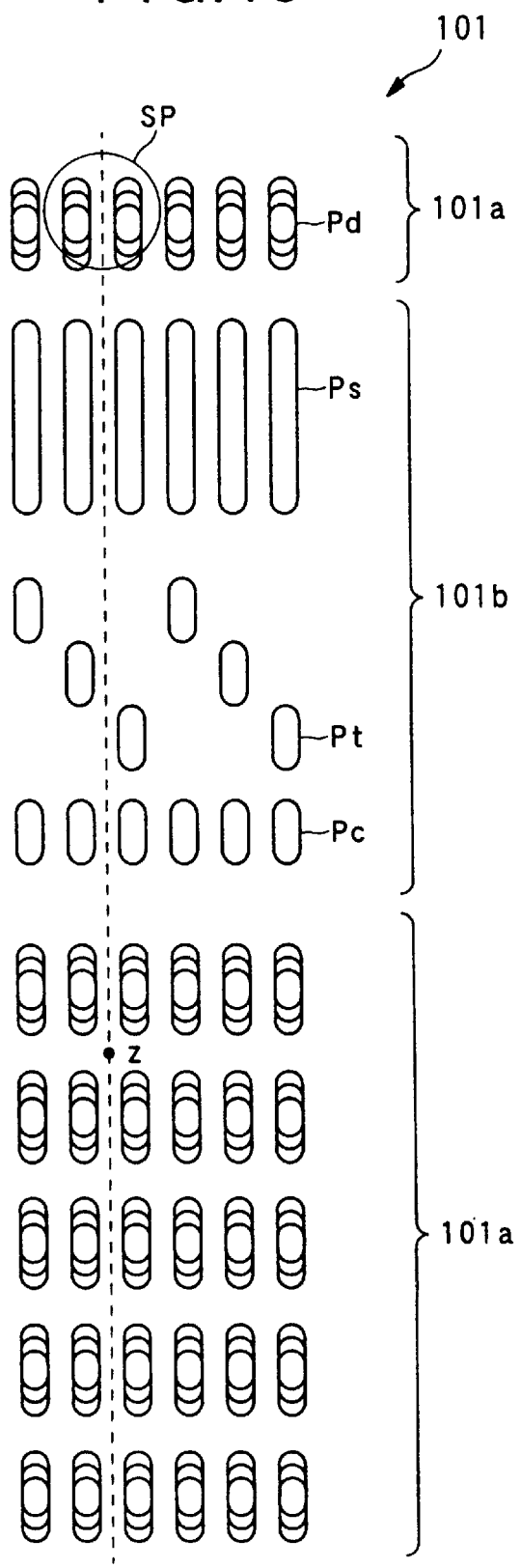
FIG. 15 is a diagram showing an arrangement of pits of an optical disc employing a multi-level pit edge recording method in accordance with the conventional art.
Figure 17:
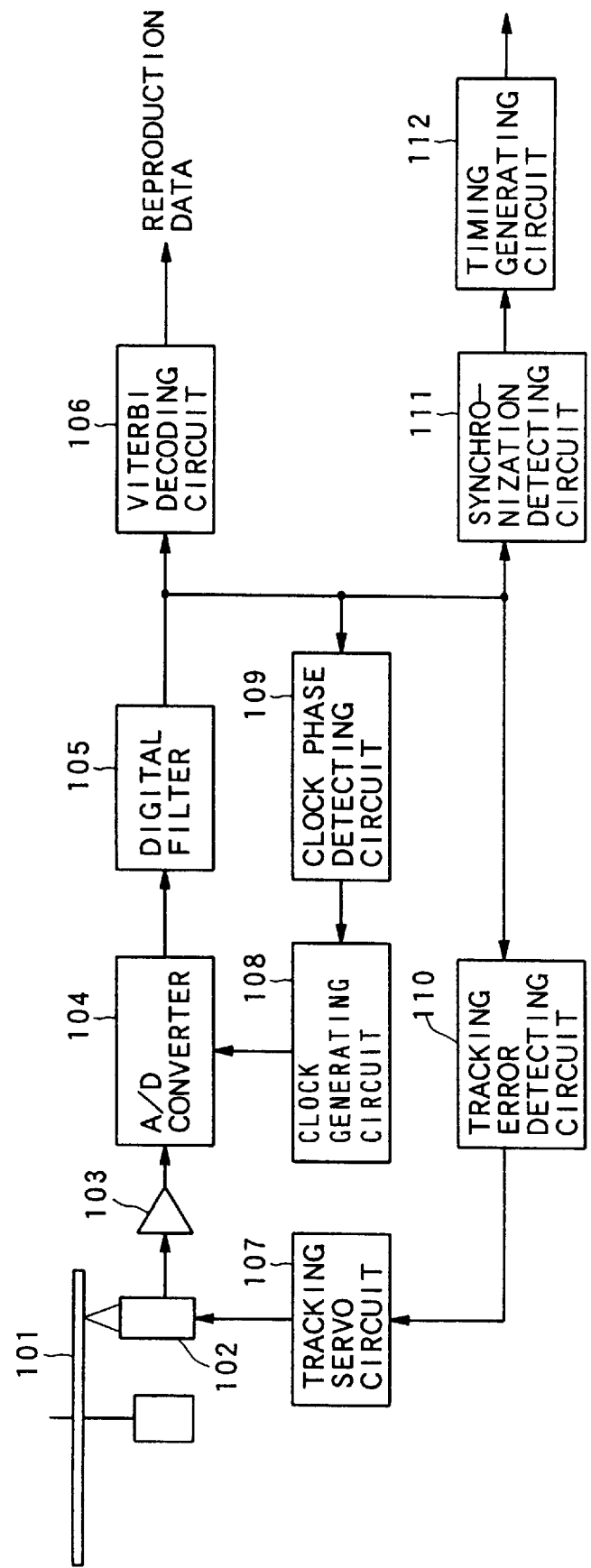
FIG. 17 is a block diagram which shows a schematic structure of an optical disc reproducing apparatus in accordance with the conventional art.

When reproducing the optical disc 1 shown in FIG. 1, a beam spot SP of a reproducing laser beam traces on a center line of two tracks shown by a broken line in FIG. 1, in the same manner as the case of FIG. 15. In FIG. 1, reading points in the reference area 1b are indicated by a to n. That is, when the beam spot SP reaches each of points a to n, the reading operation is carried out.

Figure 2:
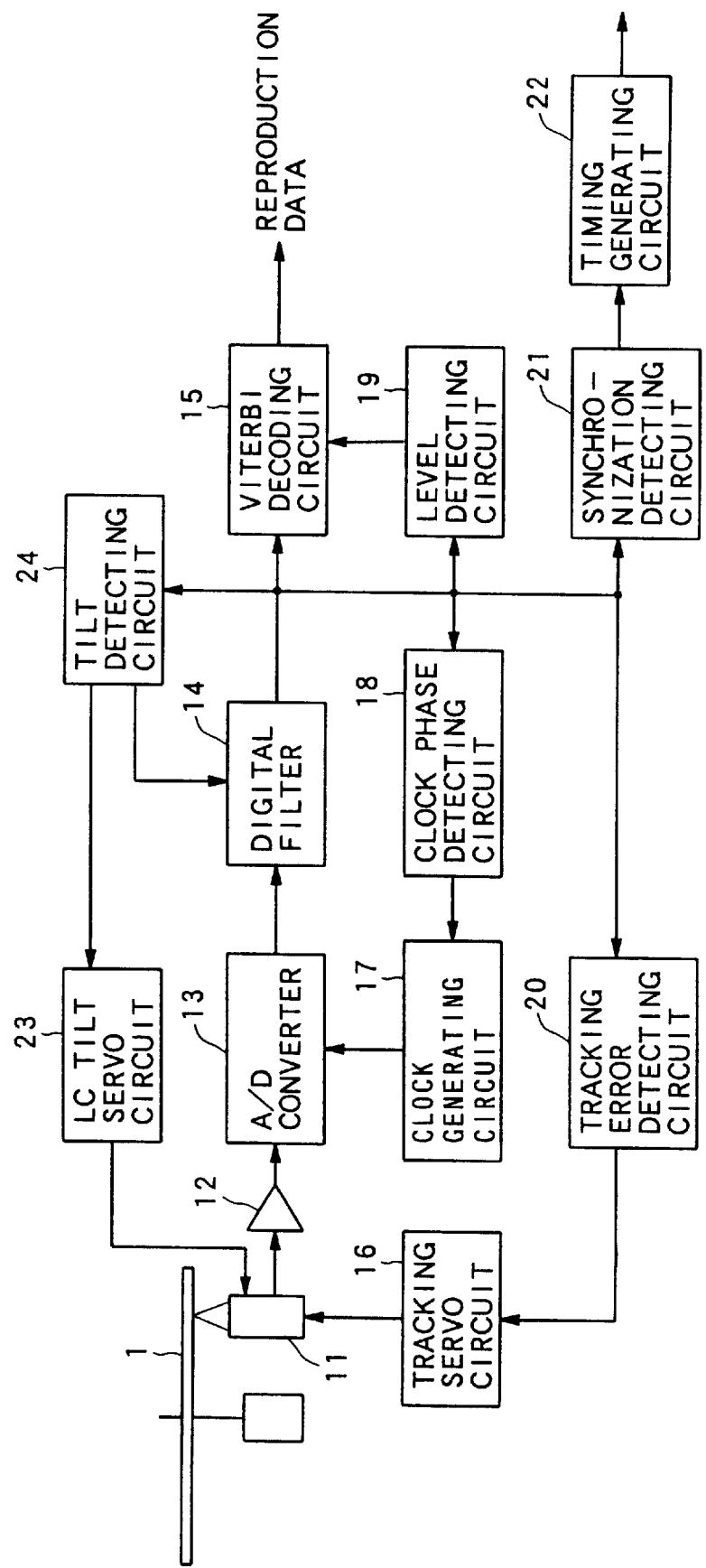
FIG. 2 is a block diagram showing a schematic structure of an optical disc reproducing apparatus in accordance with the embodiment of the present invention.

FIG. 2 shows a schematic structure of an optical disc reproducing apparatus in accordance with the embodiment of the present invention. The optical disc reproducing apparatus is designed for reproducing digital data recorded on the optical disc 1. The optical disc reproducing apparatus includes an optical pickup 11, an amplifier 12, an analog to digital (A/D) converter 13, a digital filter 14, a Viterbi decoding circuit 15, a tracking servo circuit 16, a clock generating circuit 17, a clock phase detecting circuit 18, a level detecting circuit 19, a tracking error detecting circuit 20, a synchronization detecting circuit 21, a timing generating circuit 22, a liquid crystal (LC) tilt servo circuit 23 and a tilt detecting circuit 24.

In operation, the optical pickup 11 irradiates the optical disc with the reproducing laser beam, receives the laser beam reflected by the optical disc 1, and generates an analog reproduction signal. The amplifier 12 amplifies this analog reproduction signal. The A/D converter 13 converts the analog reproduction signal into a sample value series. The digital filter 14 rectifies the waveform of the sample value series to improve its frequency characteristics. The Viterbi decoding circuit 15 compares the sample value series with its estimated value series, and generates a reproduction data series which minimizes square difference between them. The reproduction data series is output to a circuit in the later stage from the Viterbi decoding circuit 15.

The clock phase detecting circuit 18 extracts sample values corresponding to the clock pits Pc from the sample value series output from the digital filter 14, and calculates a phase error between a reproduction signal and a reproduction clock, thereby generating a phase error signal indicating the phase error. The clock generating circuit 17 changes a frequency of the reproduction clock in accordance with the phase error signal and outputs the reproduction clock to the A/D converter 13. Thus, the phase-synchronization between the reproduction clock and the reproduction signal is established.

The tracking error detecting circuit 20 extracts sample values corresponding to the tracking pits Pt from the sample value series output from the digital filter 14, and calculates a tracking error from the extracted sample values, thereby generating a tracking error signal. The tracking servo circuit 16 controls a position of the optical pickup 11 in a radial direction of the disc in accordance with the tracking error signal.

The synchronization detecting circuit 21 extracts sample values corresponding to the synchronous pits Ps from the sample value series output from the digital filter 14, and generates a synchronization detecting signal for synchronizing the reproducing system. The timing generating circuit 22 supplies various kinds of timing signals generated on the basis of the synchronization detecting signal to each of components of the optical disc reproducing apparatus.

Furthermore, in the present embodiment, the level detecting circuit 19 receives the sample value series from the digital filter 14, extracts sample values corresponding to the level reference pits Plv from the sample value series. The level detecting circuit 19 then calculates a plurality of reference levels to be supplied to the Viterbi decoding circuit 15 and temporarily stores them in a memory (not shown). These reference levels are used for a Viterbi decoding process in the Viterbi decoding circuit 15.

On the other hand, the tilt detecting circuit 24 receives the sample value series from the digital filter 14, and extracts sample values corresponding to the tilt reference pits Ptl. The tilt detecting circuit 24 then calculates a radial tilt (a tilt generated in a radial direction of the optical disc 1) and a tangential tilt (a tilt generated in a tangential direction of the optical disc 1), and generates tilt signals indicating the radial tilt and the tangential tilt.

The digital filter 14 changes tap coefficients on the basis of the tilt signal indicating the tangential tilt, and changes a frequency characteristic so as to cancel the tangential tilt.

The liquid crystal tilt servo circuit 23 adjusts control voltages which are applied to a liquid crystal panel inserted into an optical path of the optical pickup 11 on the basis of the tilt signal indicating the radial tilt, and performs a so-called liquid crystal tilt servo. In the liquid crystal tilt servo, the liquid crystal tilt servo circuit 23 changes a refractive index of each of separated areas of the liquid crystal panel, in accordance with the control voltages, thereby compensating the laser beam passing through the liquid crystal panel so as to cancel a wave aberration due to the radial tilt. In addition, the liquid crystal tilt servo is, for example, disclosed in "Application of Liquid Crystal to an Optical Head for Optical Discs" Vol. 21, No. 50, pp. 1–6 VIR'97-51, ITE Technical Report (September 1997).

FIG. 3 shows a waveform pattern of the analog reproduction signal and a pattern of the sample value series in the optical disc reproducing apparatus in accordance with the embodiment of the present invention. It is assumed that the beam spot SP moves along the center line between the adjacent two tracks from the upper side to the lower side in FIG. 1, and, each time the optical disc 1 rotates at one time, the beam spot SP moves from the left side to the right side in FIG. 1. The waveform pattern of the analog reproduction signal shown in FIG. 3 shows the pattern obtained when the beam spot SP moves on the center line (broken line) of the adjacent two tracks from the upper side to the lower side in FIG. 1. The pattern of the sample value series shown in FIG. 3 corresponds to this waveform pattern of the analog reproduction signal. Furthermore, the level of the analog reproduction signal is changed in accordance with whether or not the pit(s) exists within the range of the beam spot SP, and It is assumed that, if the pit(s) exists within the range of the beam spot SP, the level of the analog reproduction signal becomes high.

As shown in FIG. 3, in the pattern of the sample value series, the sample values denoted by black points a to n correspond to the cases of sampling the signal levels at the respective points a to n in FIG. 1. At first, since the center line leftward adjacent to the center line shown by a broken line in FIG. 1 is traced by the beam spot SP, sample values at point h and i can be obtained. Subsequently, the center line shown by the broken line in FIG. 1 is traced by the beam spot SP, and the sample values at the respective points a to g, j, k, m and n can be obtained. In addition, in the description mentioned below, the sample values corresponding to the respective points a to n are expressed by a to n as a matter of convenience.

Since the pit length of the synchronous pit Ps is long, the signal level of the corresponding analog reproduction signal is kept high for a relatively long period, and the large sample values are continuously obtained. While the beam spot SP is moved on point a to point b in FIG. 1, the large sample values including values a and b are continuously obtained as shown in FIG. 3. On the basis of the continuity of the large sample values, the synchronization detecting circuit 21 detects the synchronous pit Ps. The detection result is then used as a reference for a synchronization with respect to the later sample value series.

While the beam spot SP is moved on points c, d and e in the vicinity of the tracking pits Pt in FIG. 1, the sample values c, d and e are obtained as shown in FIG. 3. The tracking pits Pt are periodically arranged at every three tracks. In the case of FIG. 3, the sample values d and e are relatively large because the tracking pit Pt is located near point d and another tracking pit Pt is located near point e. The sample value c, on the other hand, is relatively small because there is no tracking pit Pt in the vicinity of point c. Therefore, the tracking error detecting circuit 20 can detect the fact that the beam spot SP is moved in the vicinity of the tracking pits Pt, by comparing the sample values c, d and e.

Further, in the tracking error detecting circuit 20, the tracking error signal Vt is calculated as follows:

$$Vt = d - e. \qquad (1)$$

If the trace position of the beam spot SP coincides with the ideal position (i.e., just on the center line), the sample value d is equal to the sample value e, and as a result, the tracking error signal Vt is equal to zero (Vt=0). Actually, the tracking error signal Vt is varied with displacement of the trace position. Therefore, the tracking servo is carried out on the basis of the variation of the tracking error signal Vt.

While the beam spot is moved on points f and g in the vicinity of the clock pits Pc, the sample values f and g are obtained. As shown in FIG. 1, the positional relationship between the clock pits Pc and point f and the positional relationship between the clock pits Pc and point g are similar to each other. Therefore, both the corresponding sample values f and g are relatively large and have about the same level. The clock phase detecting circuit 18 generates the phase error signal Vc by calculating as follows:

$$Vc = f - g. \qquad (2)$$

Accordingly, the accurate generation of the reproduction clock can be performed.

While the beam spot SP is moved on points m and n in the vicinity of the level reference pits Plv, the sample values m and n are obtained. As shown in FIG. 1, point n is located at the middle of two level reference pits Plv adjacent to each other in the radial direction of the optical disc 1. Point m is located at the center of a land surrounded by four level reference pits Plv. In the case of FIG. 1, four pit edges around point m are set such that left upper and right upper portions correspond to "0", a left lower portion corresponds to "1" and a right lower portion corresponds to "2". As a result, the first signal level of 0+0+1+2=3 is obtained by adding them (it is referred to as a land reference level Vl3, hereinafter). Further, four pit edges around the point n are set such that left upper and left lower portions correspond to "1" and right upper and right lower portions correspond to "2". As a result, the second signal level of 1+2+1+2=6 is obtained by adding them (it is referred to as a pit reference level Vp6). In such a manner, the level detecting circuit 19 obtains the land reference level Vl3 and the pit reference level Vp6, and provides them for the Viterbi decoding circuit 15 as estimated values. Concretely, the land reference level Vl3 at the point m is given as follows:

$$Vl3=m, \quad (3)$$

and the pit reference level Vp6 at the point n is given as follows:

$$Vp6=n. \quad (4)$$

Here, in the Viterbi decoding process with the Vitervi decoding circuit 15, nine land reference levels Vl0 to Vl8 and nine pit reference levels Vp0 to Vp8 are used. To obtain the land reference levels Vl0 to Vl8 and the pit reference levels Vp0 to Vp8, the level reference pits Plv whose pit lengths (i.e., positions of the pit edges) are regularly changed in accordance with a predetermined pattern are formed in the reference areas 1b of the optical disc 1. All of the combinations of the positions of the pit edges necessary for obtaining the nine land reference levels Vl0 to Vl8 and the nine pit reference levels Vp0 to Vp8 are formed in the reference areas 1b by the arrangement of the level reference pits Plv. Furthermore, the eighteen sample points, including points m and n, necessary for obtaining the nine land reference levels Vl0 to Vl8 and the nine pit reference levels Vp0 to Vp8 are set in the vicinity of the level reference pits Plv on the optical disc. The level detecting circuit 19 obtains the land reference levels Vl0 to Vl8 and the pit reference levels Vp0 to Vp8 in the manner mentioned above and provides them to the Viterbi decoding circuit 15.

While the beam spot SP was previously moved on points h and i in the vicinity of the tilt reference pits Ptl and while the beam spot SP is currently moved on points j and k in the vicinity of the tilt reference pits Ptl, the sample values h, i, j and k are obtained. On the basis of these sample values, the tilt direction and the tilt angle are detected.

Figure 4A:
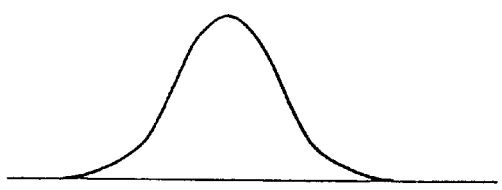
FIG. 4 is a diagram showing a beam profile of a reproducing laser beam.
Figure 4B:
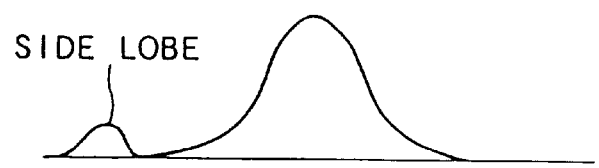

Now, to understand the principle of the detection of the tilt direction and the tilt angle, distribution of optical strength of the reproducing laser beam (a beam profile) will be explained with reference to FIG. 4. As shown in FIG. 4(a), under the ideal condition where the tilt is not generated, the distribution of optical strength substantially accords with a Gaussian distribution. On the other hand, when the tilt is generated, as shown in FIG. 4(b), the distribution of optical strength is waved and a side lobe appears. The side lobe is generated in an opposite direction to tilt direction at a magnitude corresponding to the tilt angle. Further, a position at which the side lobe is generated is definitely determined by a wavelength of the reproducing laser beam and NA of an objective of the optical pickup 11.

To detect the tilt direction and the tilt angle by utilizing such a principle, the tilt reference pit Ptl is provided in a mirror surface portion of the optical disc 1 in an independent state, and the side lobe generated by the tilt reference pit Ptl is detected from the analog reproduction signal (sample value series). Concretely, the tangential tilt signal Vtan can be determined as follows:

$$Vtan=(h+j)-(i+k). \quad (5)$$

Further, the radial tilt signal Vrad can be determined as follows:

$$Vrad=(h+i)-a+k). \quad (6)$$

Next, a description will be given of a control for the liquid crystal panel of the optical pickup 1 based on the radial tilt signal Vrad with reference to FIG. 5.

Figure 5:
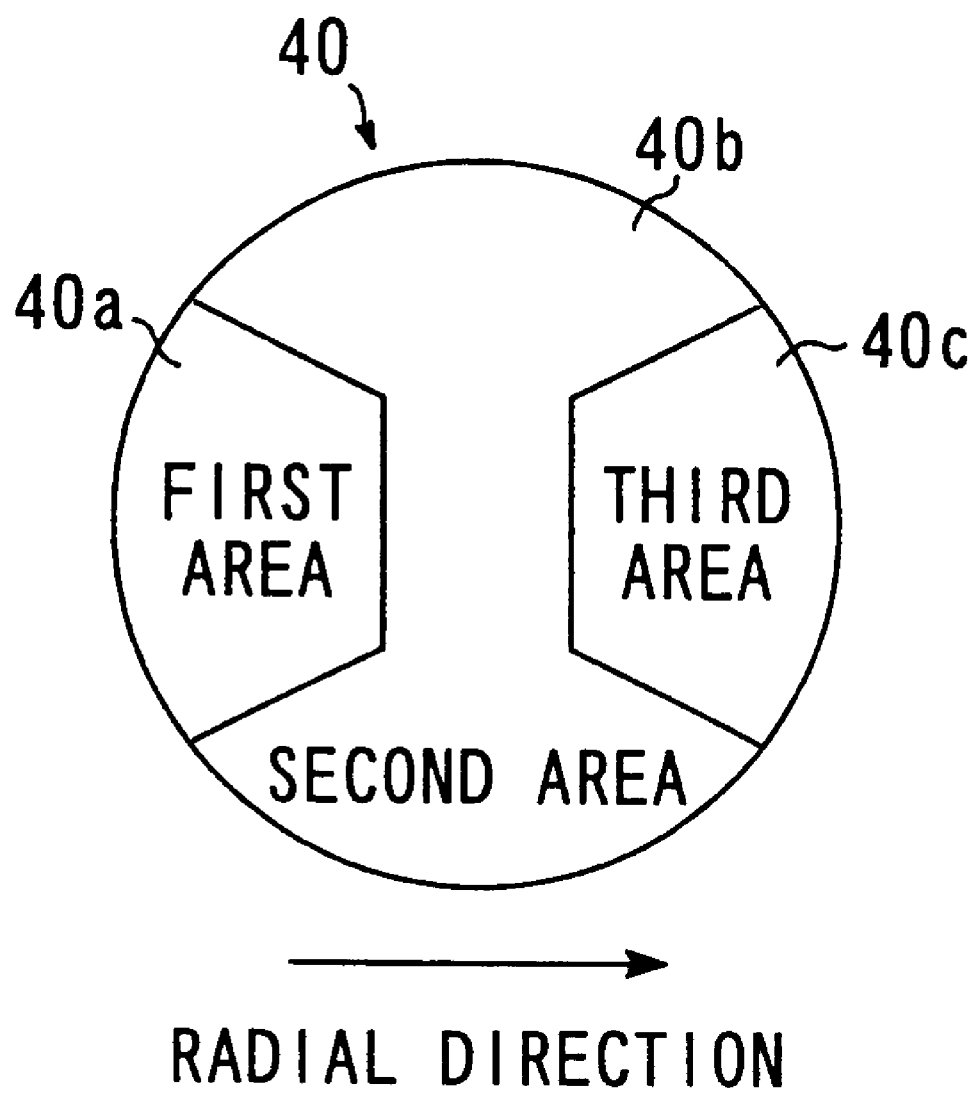
FIG. 5 is a plane view of a liquid crystal panel in the optical disc reproducing apparatus in accordance with the embodiment of the present invention.

FIG. 5 is a plane view of the liquid crystal panel 40. As shown in FIG. 5, to compensate a radial tilt, a transparent electrode on liquid crystal of the liquid crystal panel 40 is divided into three areas 40a, 40b and 40c, and these areas are arranged in the radial direction of the optical disc 1 as shown by an arrow in FIG. 5. Namely, the first area 40a is located on the inner circumferential side of the optical disc 1 within the liquid crystal panel 40. The second area 40b is located at the center of the liquid crystal panel 40. The third area 40c is located on the outer circumferential side of the optical disc 1 within the liquid crystal panel 40. If different voltages are applied to the three areas 40a, 40b and 40c, respectively, the refractive index of the liquid crystal differs at each area. Therefore, the phase difference at each area can be applied to the reproduction laser beam that passes through the liquid crystal panel 40.

By applying the phase difference at each area to the reproduction laser beam, wavefron aberration generated in the reproduction laser beam due to a radial tilt of the optical disc 1 can be reduced. The phase difference suitable for reducing the wavefront aberration can be obtained by using the radial tilt signal Vrad generated on the basis of the tilt reference pits Ptl. Concretely, the control voltages are generated by using the radial tilt signal Vrad, and they are supplied to the three areas 40a, 40b and 40c of the liquid crystal panel 40, respectively, so that the phase difference suitable for reducing the wavefront aberration can be obtained. Although the liquid crystal panel 40 is divided into the three areas 40a, 40b and 40c in FIG. 5, the present invention is not limited to this. The liquid crystal panel may be divided into four or more areas to improve the accuracy of the compensation of the wavefront aberration caused by the radial tilt.

In addition, if the direction of the arrangement of the three areas 40a, 40b and 40c is changed in such a way that the direction of the arrangement corresponds to the tangential direction of the optical disc 1, wavefront aberration caused by a tangential tilt of the optical disc 1 can be compensated by the liquid crystal panel 40.

Next, referring to FIGS. 6 to 12, a description will be given of the case that a waveform distortion and a level change are generated in the analog reproduction signal due to the various deterioration factors when the tracks are traced by the beam spot SP of the reproduction laser beam. In this case, in FIGS. 6 to 12, a sample value affected by the deterioration factors is indicated by a black point, and an illustration is given on the assumption that the other sample values are normal.

Figure 6A:
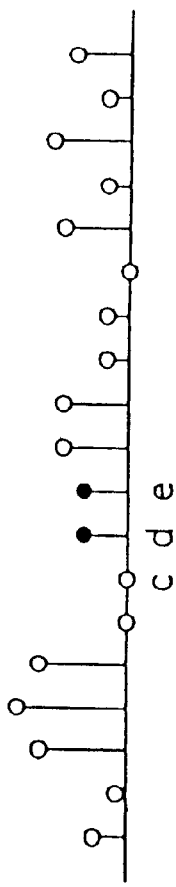
FIG. 6 is a diagram showing patterns of sample value series in the case of generating a tracking error.
Figure 6B:
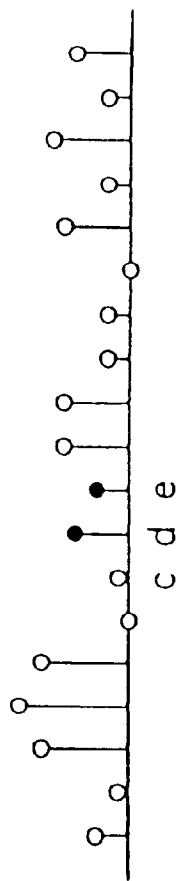
Figure 6C:
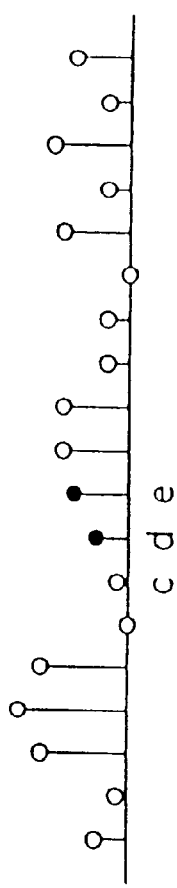

FIG. 6 shows a change of the pattern in the sample value series when the tracking error is generated, in the optical disc reproducing apparatus. At a time of reproducing the optical disc 1, the case that the tracking is normal is shown in FIG. 6(a), the case that the tracking is shifted leftward is shown in FIG. 6(b) and the case that the tracking is shifted rightward is shown in FIG. 6(c), respectively. In this case, the lateral direction mentioned above is considered to be the direction in FIG. 1.

At this time, a tracking error signal Vt can be determined by the formula (1) mentioned above. The relation d=e is established and the Vt becomes 0 in FIG. 6(a), the relation d>e is established and the Vt becomes positive in FIG. 6(b), and the relation d<e is established and the Vt becomes negative in FIG. 6(c). It can be known that they correspond to the calculated result of the formula (1).

Figure 7A:
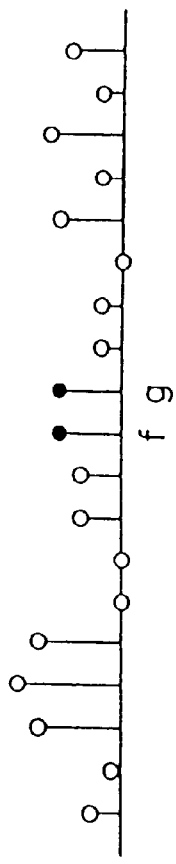
FIG. 7 is a diagram showing patterns of sample value series in the case of generating a phase error of a reproduction clock.
Figure 7B:
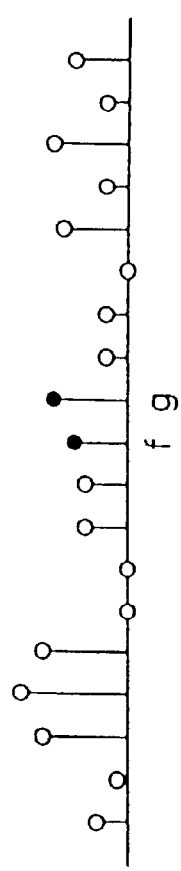
Figure 7C:
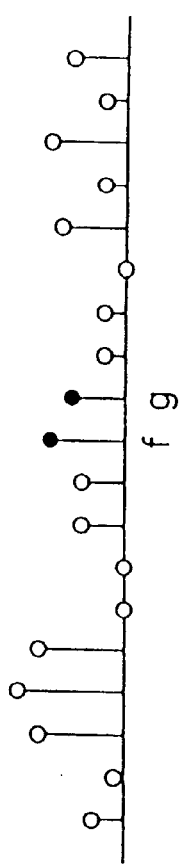

FIG. 7 shows a change of the pattern in the sample value series when the phase error of the reproduction clock is generated in the optical disc reproducing apparatus. At a time of reproducing the optical disc 1, the case that the reproduction clock is normal is shown in FIG. 7(a), the case that the reproduction clock is advanced by a predetermined amount is shown in FIG. 7(b) and the case that the reproduction clock is delayed by a predetermined amount is shown in FIG. 7(c), respectively.

At this time, a phase error signal Vc with respect to the reproduction clock can be determined by the formula (2) mentioned above. The relation f=g is established and the Vc becomes 0 in FIG. 7(a), the relation f<g is established and the Vc becomes negative in FIG. 7(b), and the relation f>g is established and the Vc becomes positive in FIG. 7(c). It can be known that they correspond to the calculated result of the formula (2).

Figure 8A:
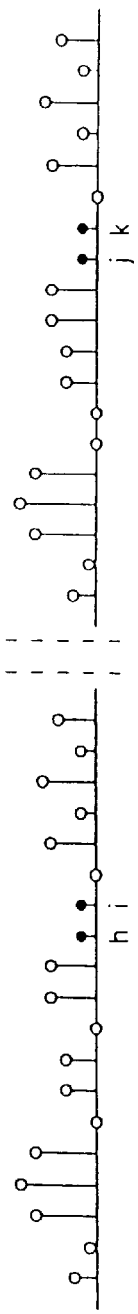
FIG. 8 is a diagram showing patterns of sample value series in the case of generating a tangential tilt of the optical disc.
Figure 8B:
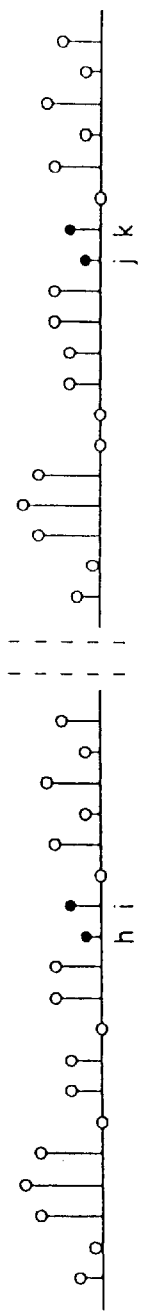
Figure 8C:
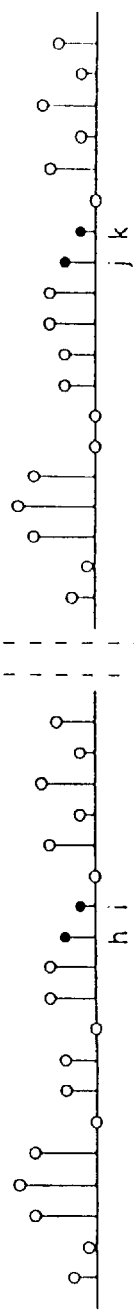

FIG. 8 shows a change of the pattern in the sample value series when the tangential tilt of the optical disc 1 is generated in the optical disc reproducing apparatus. At a time of reproducing the optical disc 1, the case that the tangential tilt is not generated is shown in FIG. 8(a), the case that an irradiating direction of the reproducing laser is tilted upward due to the tangential tilt is shown in FIG. 8(b) and the case that the irradiating direction of the reproducing laser is tilted downward due to the tangential tilt is shown in FIG. 8(c), respectively. In this case, the vertical direction mentioned above is considered to be the direction in FIG. 1.

At this time, a tangential tilt signal Vtan can be determined by the formula (5) mentioned above. Samples h, i, j and k are equal to each other and the Vtan becomes 0 in FIG. 8(a), i and k are larger than h and j and the Vtan becomes negative in FIG. 8(b), and i and k are smaller than h and j and the Vtan becomes positive in FIG. 8(c). It can be known that they correspond to the calculated result of the formula (5).

FIG. 9 shows a change of the pattern in the sample value series when the radial tilt of the optical disc 1 is generated in the optical disc reproducing apparatus. At a time of reproducing the optical disc 1, the case that the radial tilt is not generated is shown in FIG. 9(a), the case that an irradiating direction of the reproducing laser is tilted leftward due to the radial tilt is shown in FIG. 9(b) and the case that the irradiating direction of the reproducing laser is tilted rightward due to the radial tilt is shown in FIG. 9(c), respectively. In this case, the lateral direction mentioned above is considered to be the direction in FIG. 1.

At this time, a radial tilt signal Vrad can be determined by the formula (6) mentioned above. Samples h, i, j and k are equal to each other and the Vrad becomes 0 in FIG. 9(a), j and k are larger than h and i and the Vrad becomes negative in FIG. 9(b), and j and k are smaller than h and i and the Vrad becomes positive in FIG. 9(c). It can be known that they correspond to the calculated result of the formula (6).

Next, FIGS. 10 to 12 show how the level of the analog reproduction signal changes due to various factors, and show how the Viterbi decoding circuit correct this change on the basis of the level reference pits Plv.

Figure 10A:
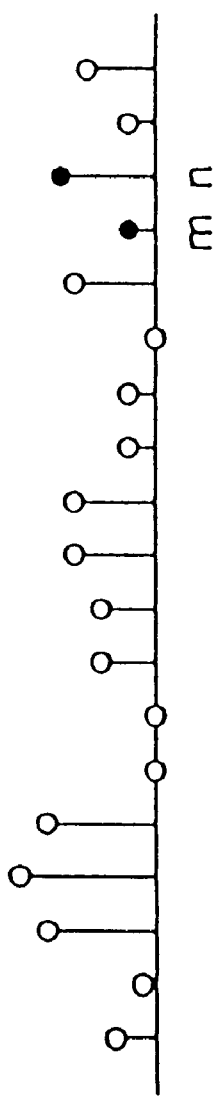
FIG. 10 is a diagram showing patterns of sample value series in the case that positions of pits on the optical disc is shifted in the tangential direction of a track.
Figure 10B:
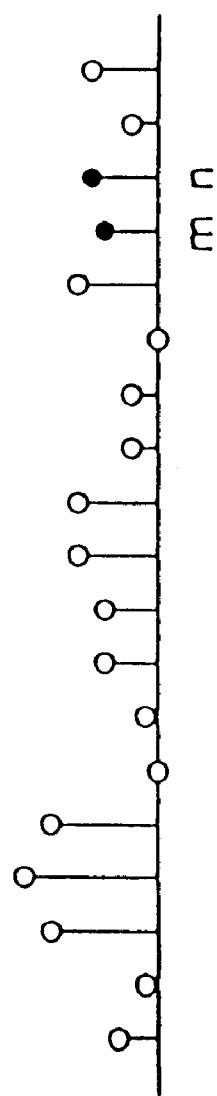

FIG. 10 shows a change of the pattern in the sample value series when the pit positions are mutually shifted in a tangential direction of the optical disc 1. The case that the pit positions are normal is shown in FIG. 10(a) and the case that they are mutually shifted is shown in FIG. 10(b), respectively.

At this time, a land reference level Vl3 at a point m is given by the formula (3) mentioned above, and a pit reference level Vp6 at a point n is given by the formula (4) mentioned above. In FIG. 10(a), n is sufficiently larger than m and a suitable level ratio is established, on the contrary, in FIG. 10(b), m and n become large and small respectively, and a difference therebetween is reduced. Accordingly, a level change caused by the shift of the pit position is reflected to m and n, further it is reflected to the land reference levels and the pit reference levels. The Viterbi decoding circuit uses the land reference levels and the pit reference levels as the estimated values, thereby it can reduce an influence by the shift of the pit position.

Figure 11A:
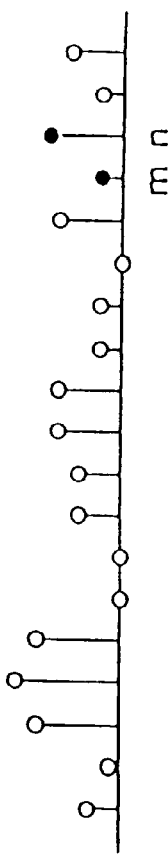
FIG. 11 is a diagram showing patterns of sample value series in the case that a track pitch of the optical disc is changed.
Figure 11B:
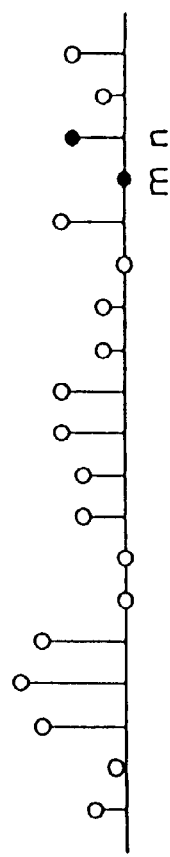
Figure 11C:
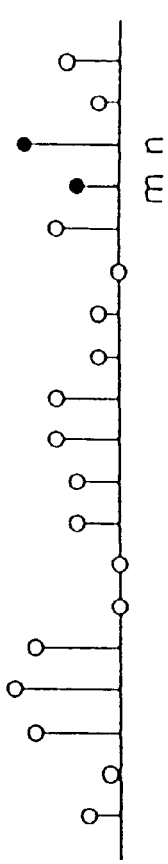

FIG. 11 shows a change of the pattern in the sample value series when the track pitch of the optical disc 1 changes. The case that the track pitch of the optical disc 1 is normal is shown in FIG. 11(a), the case that it becomes wide is shown in FIG. 11(b), and the case that it becomes narrow is shown in FIG. 11(c), respectively.

Also in this case, the land reference level Vl3 at the point m is given by the formula (3) mentioned above, and the pit reference level Vp6 at the point n is given by the formula (4) mentioned above. In comparison with FIG. 11(a) in which the levels of m and n are proper, in FIG. 11(b) both m and n become small, in FIG. 11(c) both of m and n become large. Accordingly, a level change caused by the change of the track pitch is reflected to m and n, further it is reflected to the land reference levels and the pit reference levels. The Viterbi decoding circuit uses the land reference levels and the pit reference levels as the estimated values, thereby it can reduce an influence by the unevenness of the track pitch.

Figure 12A:
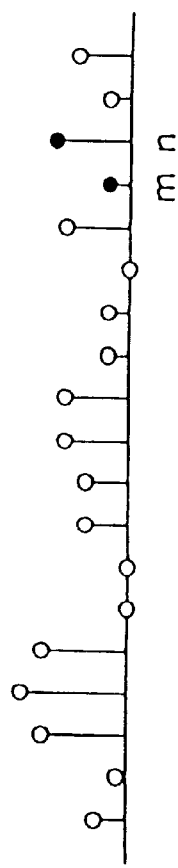
FIG. 12 is a diagram showing patterns of sample value series in the case that a length of a pit is changed due to asymmetry of the optical disc.
Figure 12B:
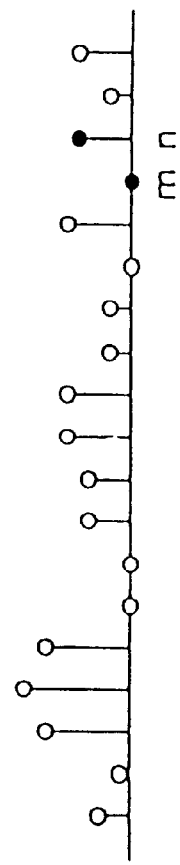
Figure 12C:
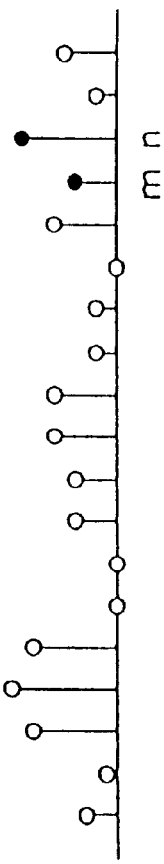

FIG. 12 shows a change of the pattern in the sample value series when an asymmetry is generated in the optical disc 1 and the pit length changes. The case that the pit length of the optical disc 1 is normal is shown in FIG. 12(a), the case that it becomes short is shown in FIG. 12(b), and the case that it becomes long is shown in FIG. 12(c), respectively.

Also in this case, the land reference level Vl3 at the point m is given by the formula (3) mentioned above, and the pit reference level Vp6 at the point n is given by the formula (4) mentioned above. In comparison with FIG. 12(a) in which the levels of m and n are proper, in FIG. 12(b) both m and n become small, in FIG. 12(c) both of m and n become large. Accordingly, a level change caused by the change of the pit length is reflected to m and n, further it is reflected to the land reference levels and the pit reference levels. The Viterbi decoding circuit uses the land reference levels and the pit reference levels as the estimated values, thereby it can reduce an influence by the asymmetry.

As mentioned above, by detecting the level change of the analog reproduction signal on the basis of the level reference pit Plv, the level change generated due to the various factors is fed back as the reference level in the Viterbi decoding circuit 15. Accordingly, the level change is corrected, it is possible to reduce the influence caused by these factors and it is possible to reproduce at higher reliability.

MODIFIED EMBODIMENT

Figure 13:
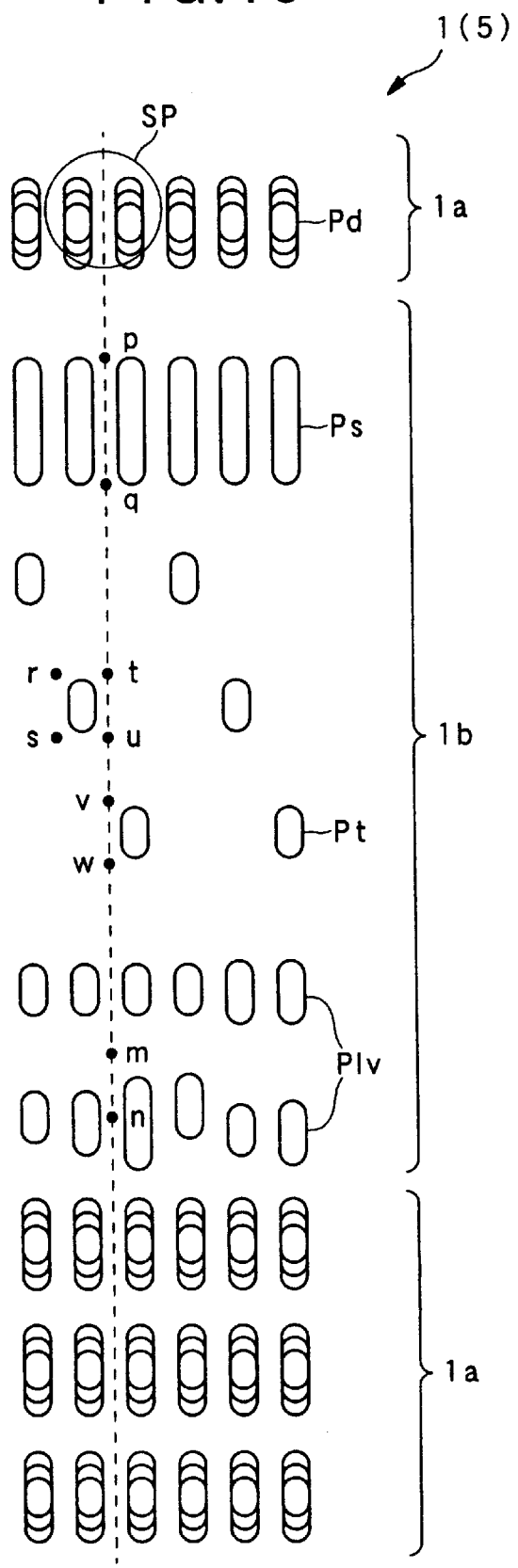
FIG. 13 is a diagram showing an arrangement of pits of an optical disc in accordance with a modified embodiment of the present embodiment.

As a modified embodiment of the embodiment mentioned above, an embodiment in which each of reference pits in the reference areas 1*b* has a plurality of functions will be described. FIG. 13 shows a pit arrangement of the optical disc 1 in accordance with the present modified embodiment.

As shown in FIG. 13, as the reference pit pattern in the reference areas 1*b*, a synchronous pit Ps, a tracking pit Pt and a level reference pit Plv are formed. That is, in the present modified embodiment, there is a difference from the case of FIG. 1 in view that the clock pit Pc and the tilt reference pit Ptl are not formed, and the other reference pits perform the functions thereof. In this case, in FIG. 13, the beam spot SP formed by irradiating the reproducing laser beam traces on the center line of two tracks shown by a broken line and respective points m, n, and p to w in the reference area 1*b* are reading points.

The synchronous pit Ps has the function of the clock pit Pc in addition. The points p and q correspond to both ends of the synchronous pit Ps in FIG. 13, a pit length thereof is made shorter than that of the synchronous pit Ps in FIG. 1 and longer than that of the clock pit Pc in FIG. 1. Further, on the basis of the sample values of the points p and q corresponding to both ends of the synchronous pit Ps, a phase error signal Vc with respect to the reproduction clock can be determined by calculating the following formula (7).

$$Vc=p-q \quad (7)$$

Further, the tracking pit Pt has the function of the tilt reference pit Ptl in addition. In FIG. 13, in addition to periodically arranging the tracking pit Pt at every three tracks, it sets the reading point in the same manner as the tilt reference pit Ptl in FIG. 1. Accordingly, the tangential tilt error signal Vtan can be determined from the sample value corresponding to the tracking pit Pt by calculating the following formula (8).

$$Vtan=(r+t)-(s+u) \quad (8)$$

In the same manner, the radial tilt error signal Vrad can be determined by calculating the following formula (9).

$$Vrad=(r+s)-(t+u) \quad (9)$$

On the other hand, the tracking error signal Vt may be determined by calculating the following formula.

$$Vt=(t+u)-(v+w)$$

In this case, in FIG. 13, a method of calculating each of the reference levels corresponding to the level reference pit Plv may be performed in the same manner as the formulas (3) and (4) mentioned above.

As mentioned above, in accordance with the present modified embodiment, by giving a plurality of functions to each of the reference pits in the reference areas 1*b* in addition, it is possible to construct each reference area 1*b* short, and it is possible to increase a recording capacity of a whole of the optical disc 1.

Figure 14:
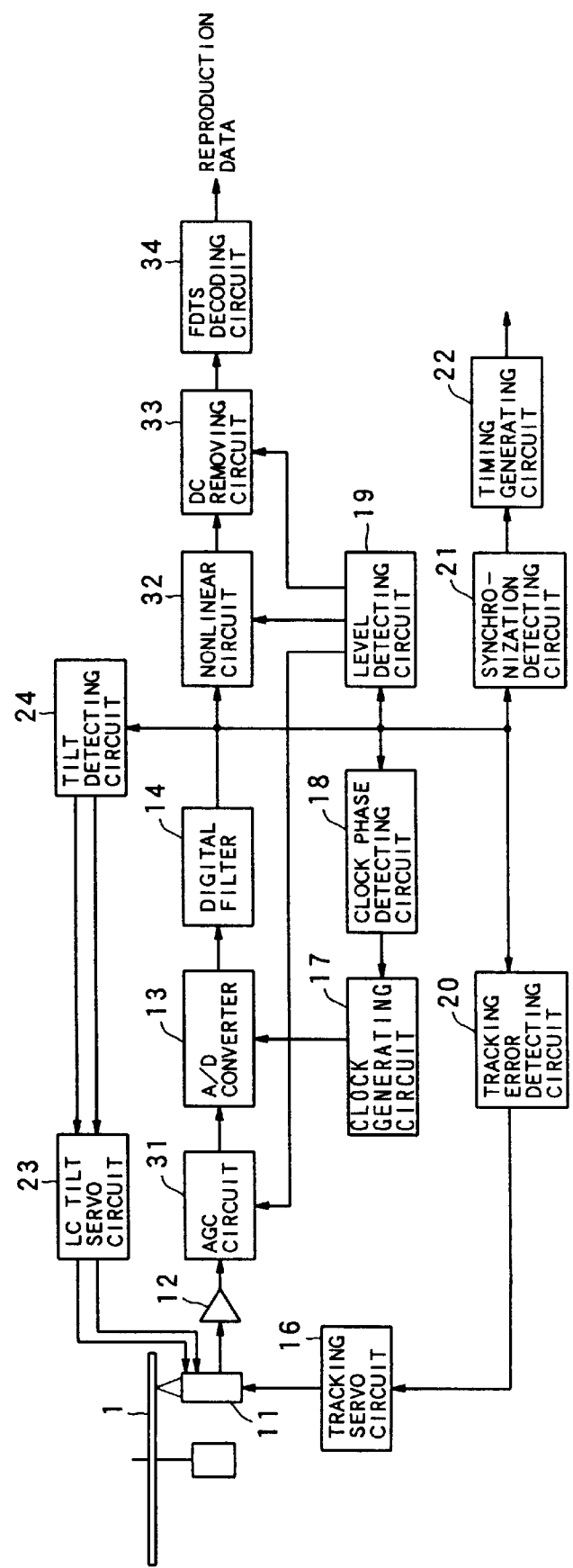
FIG. 14 is a block diagram showing a schematic structure of an optical disc reproducing apparatus in the case of employing FDTS, in another modified embodiment of the present embodiment.

Next, as another modified embodiment of the embodiment mentioned above, a description will be given of the case of employing a Fixed Delay Tree Search (FDTS) corresponding to one of maximum likelihood decoding methods in the optical disc reproducing apparatus. FIG. 14 is a view which shows a schematic structure of an optical disc reproducing apparatus in accordance with the present modified embodiment. In this case, in FIG. 14, the same reference numerals are attached to the same elements as those in FIG. 2, and a description thereof will be omitted.

In FIG. 14, an Automatic Gain Control (AGC) circuit 31 controls an amplitude of the analog reproduction signal by keeping its peak to peak (p-p) level constant. That is, it controls so as to make a gain low when the p-p level of the analog reproduction signal is larger than a predetermined level and controls so as to make the gain high when the p-p level of the analog reproduction signal is smaller than the predetermined level. Accordingly, a signal level of the analog reproduction signal is kept constant.

A nonlinear circuit 32 detects a nonlinear characteristic of a level distribution on the basis of a plurality of reference levels determined by the level detecting circuit 19 and thereafter corrects the nonlinear characteristic. That is, the nonlinear circuit 32 determines the nonlinear characteristic from the distribution of a plurality of reference levels and gives an inverse characteristic of the determined nonlinear characteristic to the sample value series output from the digital filter 14 so as to cancel the nonlinear characteristic. The nonlinear circuit 32 may achieve such a correction of the nonlinear characteristic by using a lookup table which employs a memory.

A direct current (DC) removing circuit 33 determines a center value of a plurality of reference levels determined in the level detecting circuit 19 so as to set it to a correction level, thereby controlling a center level of the sample value series mentioned above. That is, in order to remove the direct current offset in the sample value series, the direct current removing circuit 33 subtracts the correction level when the center value in the sample value series is large and adds the correction level when the center value in the sample value series is small, thereby controlling so that the center level in the sample value series is kept constant.

An FDTS decoding circuit 34 calculates a square error between the reproduction signal and a plurality of reference levels, accumulates the square error for a fixed period of about 2 to 6 clocks, and selects the decoding data which makes the accumulated value minimum. The reproduction data series is decoded by repeating such operations at every one clock.

Further, in FIG. 14, the tilt signals corresponding to both of the radial tilt and the tangential tilt are supplied to the liquid crystal tilt servo circuit 23 from the tilt detecting circuit 24. That is, in FIG. 1, the structure is made such as to correct only the radial tilt by the liquid crystal tilt servo circuit 23, however, in the present modified embodiment, the structure is made such as to correct both of the radial tilt and the tangential tilt by the liquid crystal tilt servo circuit 23. In this case, the structure may be made such that two sheets of liquid crystal panels are vertically arranged in the optical pickup 11, one of them corrects the radial tilt and another corrects the tangential tilt. This point is disclosed in "Application of Liquid Crystal to an Optical Head for Optical Discs" mentioned above.

In addition, in the embodiments mentioned above, all of the synchronous pit Ps, the tracking pit Pt, the clock pit Pc, the level reference pit Plv and the tilt reference pit Ptl are continuously provided within the reference area 1*b*. However, the synchronous pit Ps, the tracking pit Pt and the clock pit Pc mainly aim the servo, on the contrary, the level reference pit Plv and the tilt reference pit Ptl mainly aim the arrangement of the waveform, so that the pits may be separated into these two pit groups and both groups may be arranged apart from each other with respect to the data area 1a. Further, the respective pit groups for the servo and the waveform arrangement may be formed on the optical disc 1 so that frequencies of appearance thereof are different from each other. For example, the structure may be made such that a thousand of pit groups for the servo are provided within one track, and on the contrary, a hundred of pit groups for the waveform arrangement are provided within one track.

Further, in the embodiments mentioned above, a description is given of the case of employing the multi-level pit edge recording method, shifting the respective pit edges to three levels and recording three values of digital data, however, the present invention is not limited to this, and the present invention can be applied to a pit edge recording method of recording two values or four or more values of digital data.

Further, in the embodiments mentioned above, a description is given of the method of irradiating the reproducing laser beam so as to simultaneously read four pit edges positioned on two tracks and two radial lines, however, the present invention is not limited to this, and the present invention can be applied to various kinds of reading methods. For example, the present invention may be employed for methods of simultaneously reading two pit edges positioned on two tracks and one radial line, reading three pit edges positioned on three tracks and one radial line and further reading six pit edges positioned on two tracks and three radial lines. Further, the present invention can be applied to a method of simultaneously reading a plurality of pit edges on one track.

Further, in the embodiments mentioned above, a description is given of the case of adjusting the control voltages of the liquid crystal panel inserted into the optical path of the optical pickup 11 by the liquid crystal tilt servo circuit 23 so as to correct the radial tilt, however, since the radial tilt generally change slowly, it is possible to mechanically correct the radial tilt by using a motor called a tilt motor for tilting the optical pickup 11.

Further, in the embodiments mentioned above, a description is given of the case of employing a read-only type optical disc 1 which has the pits formed in the embossed shape so as to record the digital data, however, in addition, the present invention can be also applied to the case of employing a rewritable type optical disc such as an magnet-optical disc and a phase change disc. For example, the rewritable type optical disc may use super resolution films to form fine pits by shrinking the beam spot of the recording laser beam, and the reproducing laser beam may read these fine pits on a plurality of tracks simultaneously.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. Hei 11-16189 filed on Jan. 25, 1999 including the specification, claims, drawings and summary is incorporated herein by reference in its entirety.

What is claimed is:

1. An optical disc on which a plurality of data pits whose edge positions are shifted according to a multi-level pit edge recording method are recorded, the optical disc comprising:

a substrate member; and a plurality of tracks formed on the substrate member, wherein a plurality of data areas and a plurality of reference areas are formed on the substrate member such that each of the data areas and the reference areas is formed continuously over the plurality of tracks, the data pits corresponding to digital data are recorded on the tracks in each of the data areas according to the multi-level pit edge recording method, tilt reference pits which are used as a reference for detecting a tilt of the optical disc relative to a direction of a light beam which is emitted to the optical disc to record or reproduce the digital data are recorded on the tracks in each of the reference areas.

2. The optical disc according to claim 1, wherein the data areas and the reference areas are alternately arranged in a circumferential direction of the optical disc.

3. The optical disc according to claim 1, wherein the tilt reference pit is used as a reference for detecting a tilt in a radial direction of the optical disc.

4. The optical disc according to claim 1, wherein the tilt reference pit is used as a reference for detecting a tilt in a tangential direction of the optical disc.

5. The optical disc according to claim 1, wherein a first space which has no pit is formed on one of the tracks located on the left side of the track on which the tilt reference pit is formed, a second space which has no pit is formed on one of the tracks located on the right side of the track on which the tilt reference pit is formed, a third space which has no pit is formed on an upper side of the tilt reference pit, and a fourth space which has no pit is formed on a lower side of the tilt reference pit.

6. The optical disc according to claim 1, wherein the tilt reference pit is used as both the reference for detecting the tilt of the optical disc and a reference for a tracking servo control in reproducing or recording the digital data.

7. An apparatus for reproducing digital data recorded on an optical disc as a plurality of data pits whose edge positions are shifted according to a multi-level pit edge recording method, the optical disc comprising a substrate member and a plurality of tracks formed on the substrate member, a plurality of data areas and a plurality of reference areas being formed on the substrate member such that each of the data areas and the reference areas is formed continuously over the plurality of tracks, the data pits corresponding to the digital data being recorded on the tracks in each of the data areas according to the multi-level pit edge recording method, tilt reference pits which are used as a reference for detecting a tilt of the optical disc relative to a direction of a light beam which is emitted to the optical disc to reproduce the digital data being recorded on the tracks in each of the reference areas, the apparatus comprising:

a reading device that reads the data pits from the optical disc by emitting the light beam to the optical disc and generates a reproduction signal indicating the edge positions of the data pits;

a tilt detecting device that detects the tilt of the optical disc on the basis of the tilt reference pit, and generates tilt error signal indicating the tilt; and a tilt compensating device that reduces an influence of the tilt of the optical disc on the basis of the tilt error signal.

8. The apparatus according to claim 7, wherein the reading device simultaneously reads the edges of the data pits formed on at least two of the tracks which are adjacent to each other.

9. The apparatus according to claim 7, wherein the reading device simultaneously reads four of the edges of the data pits continuously formed on two of the tracks which are adjacent to each other.

10. The apparatus according to claim 7, wherein the tilt compensating device reduces wavefront aberration in the light beam.

* * * * *